United States Patent [19]

Pitner

[11] 3,964,802

[45] June 22, 1976

[54] BEARING FOR RECTILINEAR MOTION
[75] Inventor: Alfred Pitner, Paris, France
[73] Assignee: Nadella, France; a part interest
[22] Filed: Aug. 5, 1974
[21] Appl. No.: 494,889

Related U.S. Application Data
[63] Continuation-in-part of Ser. No. 317,360, Dec. 21, 1972, abandoned.

[30] Foreign Application Priority Data
Aug. 7, 1973 France................................ 73.28819

[52] U.S. Cl................................ 308/6 C; 308/202; 308/207 R
[51] Int. Cl.².......................................... F16C 17/00
[58] Field of Search............................. 308/6 C, 216

[56] References Cited
UNITED STATES PATENTS

| 3,219,398 | 11/1965 | Anjerson | 308/6 C |
| 3,301,611 | 1/1967 | Dunlap | 308/6 C |
| 3,552,814 | 1/1971 | Altson et al. | 308/217 |
| 3,586,407 | 6/1971 | Schweitzer | 308/217 |
| 3,642,330 | 2/1972 | Newman | 308/215 |
| 3,704,919 | 12/1972 | Titt | 308/215 |

Primary Examiner—Robert R. Song
Assistant Examiner—Richard A. Bertsch
Attorney, Agent, or Firm—Robert E. Burns; Emmanuel J. Lobato; Bruce L. Adams

[57] ABSTRACT

Bearing having in a body two rectilinear inner raceways interconnected by semi-circular inner end surfaces, particular outer end surfaces defining roller re-circulation passages with the semi-circular inner surfaces, and rollers which roll along the raceways and pass round the re-circulation passage. The rollers are guided at the roller ends by guide surfaces and are exposed on one of the sides of the bearing body. The rollers are retained radially to within a predetermined distance from the rectilinear inner raceways by means associated with the rollers and disposed in grooves in the bearing body adjacent the guide surfaces. Alternatively, the means associated with the rollers may be engaged in grooves defined between an edge of an aperture in a plate and a part of the bearing body, the plate being interposed between the corresponding end of the rollers and a part of the bearing body and defining an end guide surface for the rollers.

26 Claims, 11 Drawing Figures

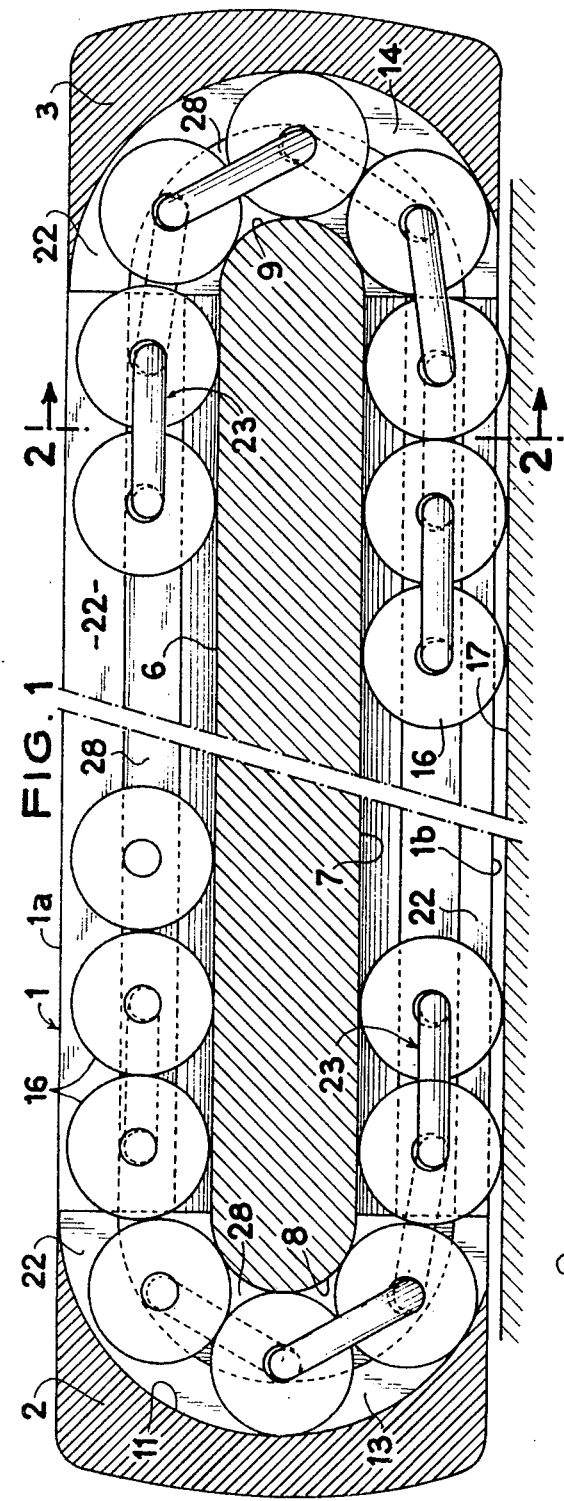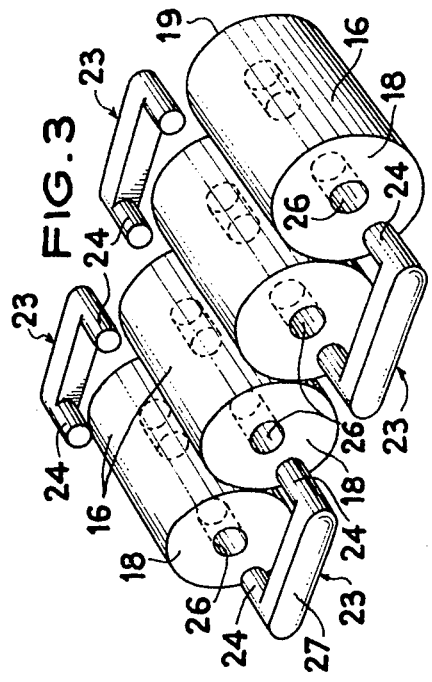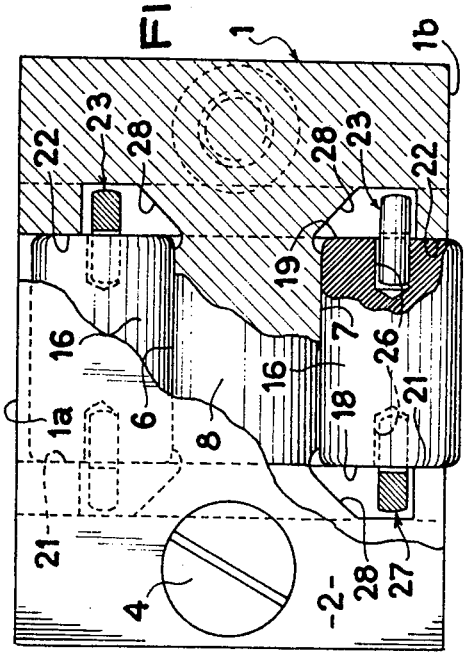

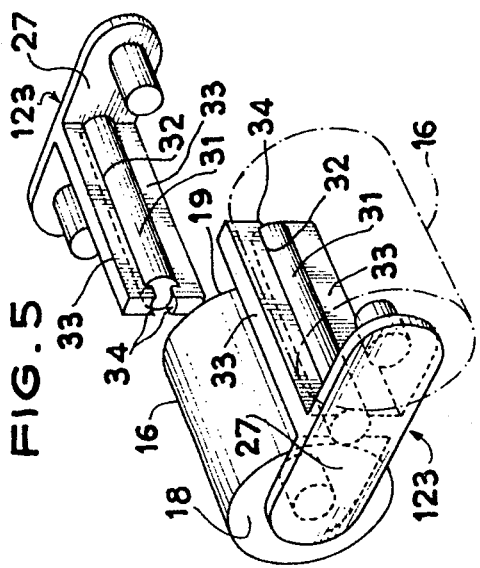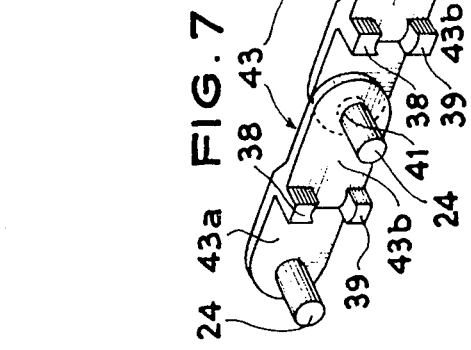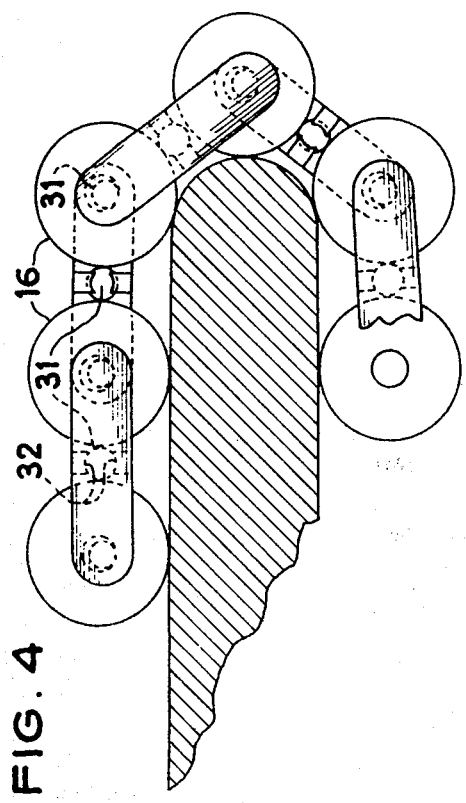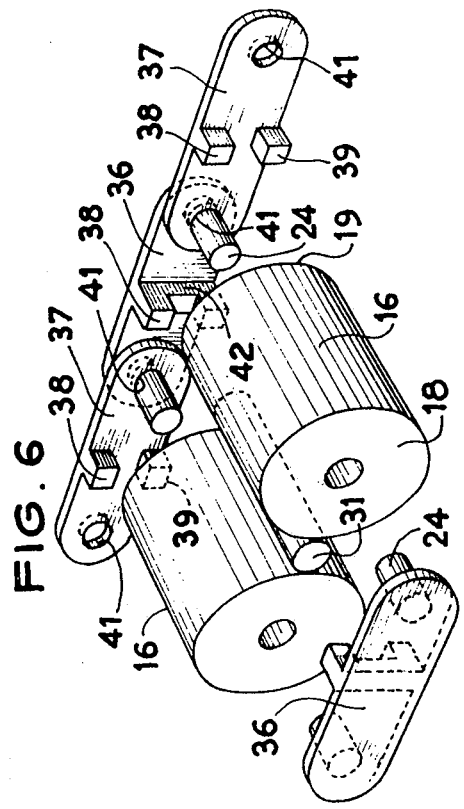

BEARING FOR RECTILINEAR MOTION

This application is a Continuation-In-Part of my application Ser. No. 317,360, filed Dec. 21, 1972 now abandoned.

The present invention relates to a bearing having cylindrical rolling elements for the guiding of two parts subjected to a relative movement of translation, comprising a bearing body in which are formed two rectilinear and parallel inner raceways interconnected by two re-circulation passages for the rolling elements, the latter being provided with retaining means and being guided by their planar end faces against planar surfaces of the bearing body.

Bearings of this type, which are employed in co-operation with a planar raceway, for example in some machine tools for the rectilinear guiding of a moving part, must be very reliable in operation and constructed in such manner that, owing to the effect of the retaining means, the bearing elements constitute with the bearing body a united assembly.

Roller bearings are known for longitudinal movement in various forms. The disadvantage of the known bearings resides in most cases in the fact that the guiding and the retention of the rolling elements require arrangements which result in relatively high cost and/or unreliable operation.

Thus, for example, in some known arrangements, the rolling elements must undergo an additional machining involving the removal of material which increases the manufacturing cost or renders the obtainment of the required precision difficult, the bearing elements being, for example, in some cases reduced in diameter in the median part of their cylindrical profile and in other cases provided with an axial throughway aperture or journals at their ends.

In some other arrangements, there are interposed between the rolling elements retaining elements which reduce the load capacity in that the number of rolling elements per unit length of the raceway transmitting the applied load is reduced.

An object of the invention is to avoid the aforementioned drawbacks and to provide means for retaining the rolling elements which are simpler and cheaper to manufacture while allowing maximum load capacity and a very high precision in the guiding of the rolling elements by a sliding contact of their ends which are ground with precision and cheaply.

According to the invention, this is achieved owing to the fact that the retaining means are formed by elements engaged in blind cavities in the ends of the rolling elements and in cavities in the bearing body which are adjacent the planar guide surfaces.

Owing to this feature there is obtained with relatively simple means and with a remarkable precision an effective retention of the rolling elements with no need to drill the rolling elements throughout their length which would otherwise reduce their stiffness under load owing to possible crushing or at any rate an elastic yield in their middle part. On the other hand, this stiffness is reduced at the ends owing to the presence of the cavities so that concentration of forces at these ends is avoided with no need to effect a complex and costly grinding of the outer surface so as to produce a barrel-shaped or "backed-off" profile.

According to another feature of the invention, the cylindrical retaining elements engaged in two adjacent rolling elements are interconnected in pairs by connecting bars or shackles engaged in the cavities in the bearing body, these bars having an alternating disposition on the two sides corresponding to the two guiding surfaces so that the assembly comprising the rolling elements and the bars carrying the retaining means constitutes a flexible endless belt which markedly facilitates the assembly. Further, another advantage is that the retaining means may be constructed at relatively low cost.

The rolling elements may be in adjoining relation in order to afford maximum load capacity in accordance with the required conditions of operation or separated by inserted cylindrical elements of smaller diameter which ensure, with minimum loss of capacity, a much reduced overall coefficient of friction whenever this condition is of prime importance for the contemplated utilisation since the inserted elements eliminate sliding friction between the rolling elements.

Further features and advantages of the invention will be apparent from the ensuing description with reference to the accompanying drawings.

In the drawings:

FIG. 1 is a partial longitudinal sectional view of a roller bearing;

FIG. 2 is a partial sectional view taken on line 2—2 of FIG. 1;

FIG. 3 is a perspective view of a group of rollers and their retaining means;

FIG. 4 is a partial view similar to FIG. 1 of a bearing which comprises inserted cylindrical elements;

FIG. 5 is a perspective view of two rollers employed in the bearing shown in FIG. 1 and the disposition of the inserted cylindrical rolling elements;

FIG. 6 is a perspective view of two rollers separated by an inserted element according to another embodiment in which the connecting bars constitute links of a chain;

FIG. 7 is a perspective view of two bars constituting chain links according to the modification shown in FIG. 6;

Figure 9:
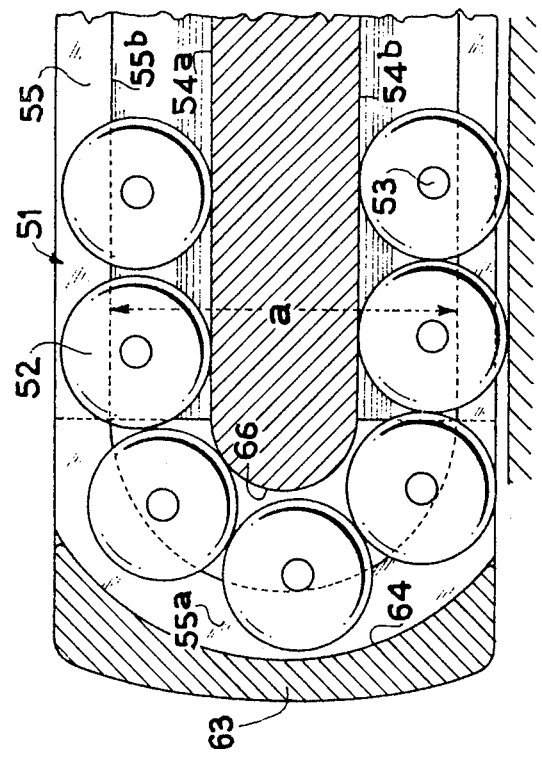
FIG. 9 is a sectional view taken on line A—A of FIG. 8.

The roller bearing shown in FIG. 1 has a general rectangular-sided shape and comprises a bearing body 1 and two end walls 2, 3 which are assembled with the body 1 for example by means of screws 4. Formed in the bearing body 1 are two rectilinear and parallel inner raceways 6, 7 and two semicircular inner raceways 8, 9 which interconnect the rectilinear raceways 6, 7 and define therewith a continuous endless inner raceway.

The end walls 2, 3 define outer raceways 11, 12 in the form of an arc of a circle which define in combination with the semi-circular raceways 8, 9 of the bearing body two passages 13, 14 for the re-circulation of rollers 16. The latter are set back from the upper surface 1a of the bearing body when they roll on the upper raceway 6 whereas they project downwardly from the lower surface 1b of the bearing body when they roll along the lower rectilinear raceway 7, the lower rollers thus being capable of moving along a planar outer raceway 17 which is formed for example on a table of a machine tool.

As shown in FIG. 2, the bearing body has an H-shaped cross section whose limbs define side walls between which are disposed the rollers 16 which are guided at their ground planar ends 18, 19 by vertical planar surfaces 21, 22 formed on these side walls. These guide surfaces 21, 22 are also provided in the end walls 2, 3 to ensure continuity in the guiding of the rollers.

In order to preclude escape of the rollers when transporting and handling the rolling bearing prior to mounting it in a mechanical system, there is provided retaining means comprising needles or pins engaged in the ends of the rolling elements 16 or alternatively shackles 23 each one of which has two cylindrical elements 24 engaged with clearance in blind cylindrical apertures 26 formed in the end faces 18, 19 of the rollers and integral with a connecting bar 27 which is engaged in a groove 28 formed in the side walls of the bearing body between the guide surface 22 and the rectilinear raceways 6, 7 and in the end walls 2, 3. It will be observed that the grooves 28 define surfaces which serve to retain the elements 24 of the shackles 23 in the blind apertures 26.

As can be clearly seen in FIG. 3, two retaining elements 24 of the same shackle 23 are engaged in the ends 18 of two successive rollers 16 whereas the two retaining elements 24 engaged in apertures 26 of the other ends 19 of these rollers are part of two separate shackles 23. The assembly of the rollers 16 of the bearing formed by the alternating arrangement of the shackles 23 on the respective ends of the rollers constitutes an endless belt structure.

Whereas in FIGS. 1–3 the rollers 16 are in adjoining relation, each roller 16 shown in FIGS. 4 and 5 is separated from the following roller by an inserted cylindrical element 31 of small diameter which, being in rolling contact with the two adjacent rollers, avoids sliding friction which otherwise occurs between the adjoining rollers in the previously-described embodiment. Each inserted element 31 is retained radially in an aperture formed between inner concave surfaces 32 of two strip portions 33 which are integral with the connecting bar of the shackle 123 whose retaining elements 24 are engaged in the adjacent rollers 16. Radially extending projecting portions 34 formed at the ends of the strip portions 33 opposed to the connecting bar 27 axially retain the corresponding inserted element 31.

In the embodiment shown in FIG. 6, on each side of the bearing, the retaining elements 24 for the rollers 16 are formed on or fixed to links 36 pivoted to links 37 so as to constitute a chain structure. For retaining the corresponding end of the inserted element 31, each link has two axial bosses 38, 39. Each chain link 36 has two cylindrical retaining elements 24 each of which extends through an aperture 41 in the adjacent link 37 having no retaining element 24 fixed or formed thereon. In order to compensate for the double thickness due to the overlapping of the links, the bosses 38 of the link 36 have an axial extent which exceeds that of the bosses 38 of the link 37 and there is provided between the bosses 38 of the link 36 a raised portion 42. The links 36 have retaining elements 24 whereas the links 37 have no retaining elements.

In the modification shown in FIG. 7, all the links 43 are identical and each has on each side of the retaining bosses 38, 39 a cylindrical retaining element 24 and an aperture 41 through which the element 24 of the adjacent link extends, the portion 43b in which the aperture 41 is provided being axially offset from the portion 43a which carries the cylindrical element 24 so that a double thickness due to the overlapping of the links is avoided.

The shackles 23, 123 shown in FIGS. 1–5 and the links 36, 37, 43 shown in FIGS. 6 and 7 are advantageously constructed from moulded material.

Note, moreover, that instead of retaining the rollers 16 by means of cylindrical elements coupled in pairs, this retention may be achieved by means of individual cylindrical elements advantageously constituted by needles of needle bearings.

The foregoing description describes retaining means formed by cylindrical elements or pins engaged in cylindrical apertures in the ends of the rolling elements and in grooves formed in the side faces of the bearing body which are adjacent the planar guide surfaces. However, experience has shown that it is rather difficult to mass-produce bearing bodies having grooves machined by undercutting or recessing and planar guide surfaces whose surface quality and orthogonality to the raceways must be particularly good. Moreover, the presence of an overhanging due to the grooves may be a cause of fragility of the parts of the bearing body carrying the planar guide surfaces for the rolling elements.

Figure 8:
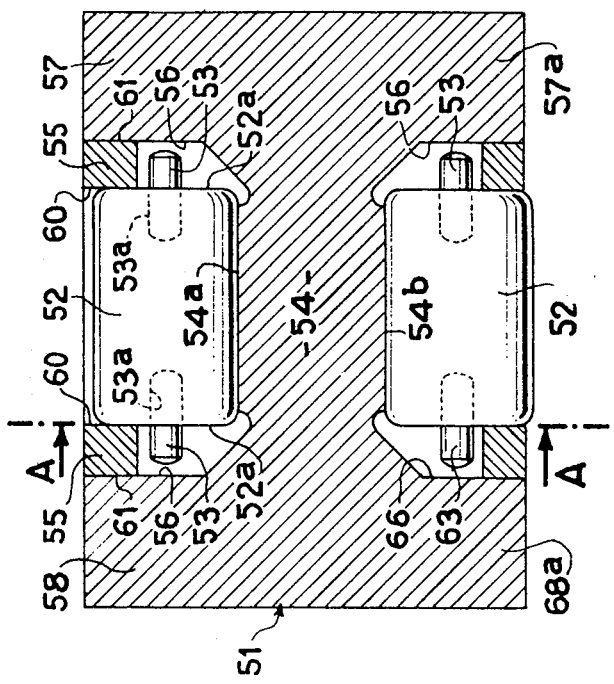
FIG. 8 is a sectional view of a bearing according to another embodiment of the invention.
Figure 10:
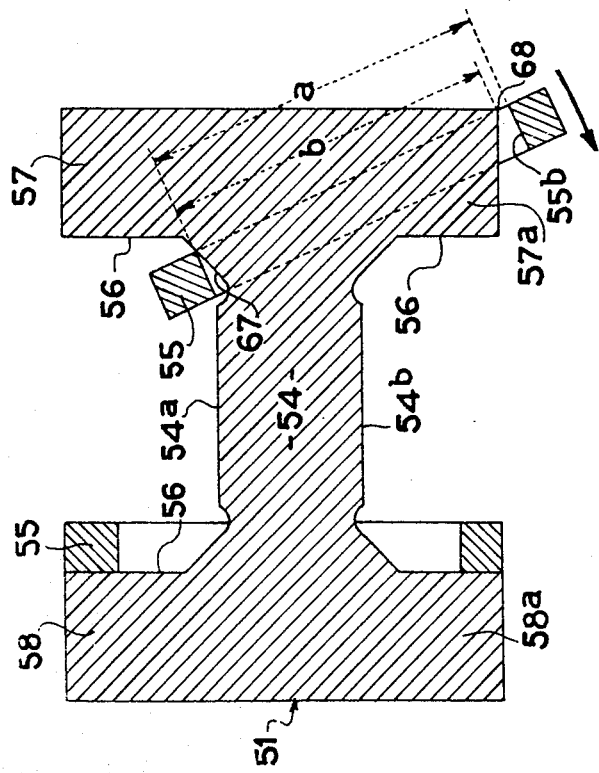
FIG. 10 is a view of the assembly, in the bearing body, shown in FIG. 8 of a rolling element retaining ring.

The embodiment shown in FIGS. 8–10 conserves the essential features of the bearings shown in FIGS. 1–7, but affords an arrangement which is better adapted to the requirements of mass production and avoids any fragility of the bearing body.

FIG. 8 shows a bearing body 51 whose section has the general shape of an H whose four limbs form side faces between which there are disposed cylindrical rolling elements 52 constituted by rollers. The elements 52 roll along rectilinear raceways 54a, 54b formed on the two faces of the horizontal branch 54 of the H. The rolling elements 52 are retained in the body 51, in the course of handling by cylindrical pins 53 which are engaged in cylindrical apertures 53a formed in the planar end surfaces 52a of the elements 52, the projecting portion of the pins being capable of abutting against two flat rings 55 which are secured to the inner side face 56 of the limbs 57, 57a, 58, 58a of the bearing body. Each ring 55 is cut out or blanked from a sheet, such as sheet steel, whose rolled surfaces corresponds to the surfaces 60, 61 respectively in contact with the end surface 52a of the rolling elements and with the side face 56. These rolled surfaces are of excellent quality for guiding the end surface 52a of the rolling elements.

In FIG. 9 there are shown two inner, rectilinear and parallel raceways 54a, 54b and one of the semi-circular inner raceways 66 which interconnects the rectilinear raceways and define with two outer raceways 64, in the form of a partcircular segments, two re-circulation passages for the rolling elements 52.

Secured to each end of the bearing body 51 is an end wall 63 in which is formed the semi-circular outer raceway 64 which receives, in bearing relation thereto, the semi-circular end portion 55a of the two rings 55.

To place a ring 55 in position (FIG. 10), it is slipped over one of the limbs, for example limb 57, until one of its rectilinear edges reaches the cut-away face 67 formed between the corresponding raceway 54a and the side face 56, then the ring is tilted about this face 67 by causing the opposite rectilinear edge to pass round the outer edge 68 of the opposite limb 57a, it being understood that the transverse dimension a of the inner aperture 55b of the ring 55 is less than the distance b between the end point of the face 67 and the edge 68. The rings 55 are secured in position by clamping thereagainst the two end walls 63, for example by means of holding screws engaged in the bearing body.

Figure 11:
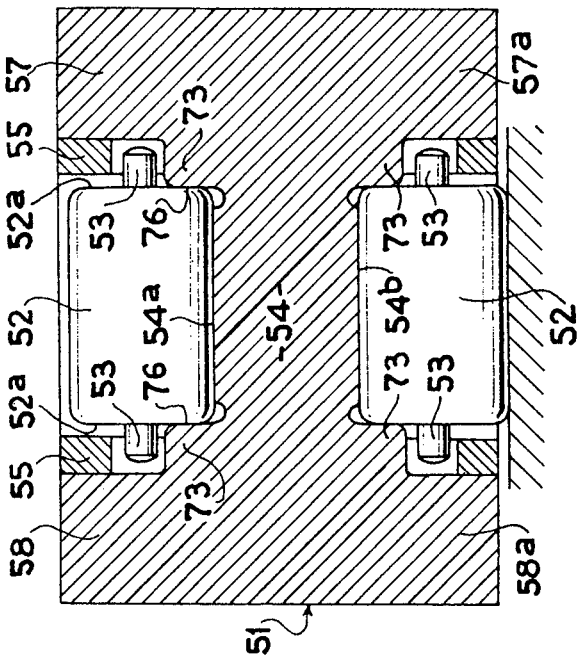
FIG. 11 is a view of a modification of the bearing shown in FIG. 8.

In FIG. 11 the rings 55, thinner than those shown in FIG. 8, merely have the function of radially retaining the pins 53 and the guiding of the rolling elements 52 is ensured by the planar surface 76 of shoulders 73 formed between the rectilinear raceways 54a, 54b and the side faces 56 of the limbs 57, 57a, 58, 58a.

Having now described my invention what I claim as new and desire to secure by Letters Patent is:

1. In a rolling bearing for guiding two parts subjected to a relative movement of translation, comprising a row of rolling elements having planar end surfaces, a body structure defining two rectilinear and parallel inner raceways, two semi-circular inner raceways which interconnect the rectilinear inner raceways, two part-circular outer raceways defining with the semi-circular inner raceways two passages for the re-circulation of the rolling elements and planar guide surfaces for guiding the planar end surfaces of the rolling elements; the improvement comprising retaining means for retaining the rolling elements to within a predetermined distance from the rectilinear inner raceways, which retaining means comprise means defining blind axial apertures in opposite ends of the rolling elements, the rolling elements being solid in a part of the rolling elements intermediate the blind apertures, said retaining means further comprising grooves in the body structure adjacent the planar guide surfaces and retaining elements extending axially of the rolling elements into the apertures and axially beyond the planar guide surfaces and into the grooves, the grooves defining surfaces which are engageable by the retaining elements axially of the rolling elements for retaining the retaining elements in the apertures.

2. A bearing as claimed in claim 1, wherein the retaining elements are cylindrical needles.

3. A bearing as claimed in claim 1, wherein the retaining elements are pins.

4. A bearing as claimed in claim 1, wherein the rolling elements are capable of contacting each other.

5. In a rolling bearing for guiding two parts subjected to a relative movement of translation, comprising a row of rolling elements having planar end surfaces, a body structure defining two rectilinear and parallel inner raceways, two semi-circular inner raceways which interconnect the rectilinear inner raceways, two part-circular outer raceways defining with the semi-circular inner raceways two passages for the re-circulation of the rolling elements and planar guide surfaces for guiding the planar end surfaces of the rolling elements, retaining means for retaining the rolling elements to within a predetermined distance from the rectilinear inner raceways; the feature that said retaining means comprise means defining blind axial apertures in opposite ends of the rolling elements, the rolling elements being solid in a part of the rolling elements intermediate the blind apertures, said retaining means comprising grooves in the body structure adjacent the planar guide surfaces and retaining elements extending into the apertures and into the grooves, the grooves defining surfaces for retaining the retaining elements in the apertures, and connecting bars respectively interconnecting pairs of retaining elements disposed in the blind apertures of pairs of successive rolling elements.

6. A bearing as claimed in claim 5, wherein each pair of retaining elements are integral with the corresponding connecting bars and constitute a shackle.

7. In a rolling bearing for guiding two parts subjected to a relative movement of translation, comprising a row of rolling elements having planar end surfaces, a body structure defining two rectilinear and parallel inner raceways, two semi-circular inner raceways which interconnect the rectilinear inner raceways, two part-circular outer raceways defining with the semi-circular inner raceways two passages for the re-circulation of the rolling elements and planar guide surfaces for guiding the planar end surfaces of the rolling elements, and retaining means for retaining the rolling elements to within a predetermined distance from the rectilinear inner raceways; the feature that said retaining means comprise means defining blind axial apertures in opposite ends of the rolling elements, the rolling elements being solid in a part of the rolling elements intermediate the blind apertures, grooves in the body structure adjacent the planar guide surfaces, retaining elements extending into the apertures and into the grooves and connecting bar portions respectively interconnecting pairs of retaining elements disposed in the apertures of pairs of successive rolling elements so that each pair of retaining elements are integral with the corresponding bar portion and constitute a shackle, there being disposed in the apertures at one end of each pair of successive rolling elements the retaining elements of the same shackle and there being disposed in the apertures at the opposite end of said each pair of successive rolling elements the retaining elements of two separate adjacent shackles, the grooves defining surfaces cooperative with the shackles for retaining the retaining elements in the apertures.

8. In a rolling bearing for guiding two parts subjected to a relative movement of translation, comprising a row of rolling elements having planar end surfaces, a body structure defining two rectilinear and parallel inner raceways, two semi-circular inner raceways which interconnect the rectilinear inner raceways, two part-circular outer raceways defining with the semi-circular inner raceways two passages for the recirculation of the rolling elements and planar guide surfaces for guiding the planar end surfaces of the rolling elements, retaining means for retaining the rolling elements two within a predetermined distance from the rectilinear inner raceways; the feature that said retaining means comprise means defining blind axial apertures in opposite ends of the rolling elements, the rolling elements being solid in a part of the rolling elements intermediate the blind apertures, said retaining means comprising grooves in the body structure adjacent the planar guide surfaces and retaining elements extending into the apertures and into the grooves, the grooves defining surfaces for retaining the retaining elements in the apertures, cylindrical elements of small diameter being inserted between successive rolling elements and respectively separating and in rolling contact with the successive rolling elements.

9. In a rolling bearing for guiding two parts subjected to a relative movement of translation, comprising a row of rolling elements having planar end surfaces, a body structure defining two rectilinear and parallel inner raceways, two semi-circular inner raceways which interconnect the rectilinar inner raceways, two part-circular outer raceways defining with the semi-circular inner raceways two passages for the re-circulation of the rolling elements and planar guide surfaces for guiding the planar end surfaces of the rolling elements, and retaining means for retaining the rolling elements to within a pedetermined distance from the rectilinear inner raceways; the feature that said retaining means comprise means defining blind axial apertures in opposite ends of the rolling elements, the rolling elements being solid in a part of the rolling elements intermediate the blind apertures, grooves in the body structure adjacent the planar guide surfaces, retaining elements extending into the apertures and into the grooves and connecting bar portions respectively interconnecting pairs of retaining elements disposed in the apertures of pairs of successive rolling elements so that each pair of retaining elements are integral with the corresponding bar portion and constitute a shackle, there being disposed in the apertures at one end of each pair of successive rolling elements the retaining elements of the same shackle and there being disposed in the apertures at the opposite end of said each pair of successive rolling elements the retaining elements of two separate adjacent shackles, and inserted cylindrical elements of small diameter respectively separating and in rolling contact with successive rolling elements, each shackle having means for supporting the inserted element between the associated pair of rolling elements, the grooves defining surfaces cooperative with the shackles for retaining the retaining elements in the apertures.

10. A bearing as claimed in claim 9, wherein the means for supporting each inserted element comprise two strip portions integral with the connecting bar portion of the shackle and disposed on opposite sides of the inserted element.

11. In a rolling bearing for guiding two parts subjected to a relative movement of translation, comprising a row of rolling elements having planar end surfaces, a body structure defining two rectilinear and parallel inner raceways, two semi-circular inner raceways which interconnect the rectilinear inner raceways, two part-circular outer raceways defining with the semi-circular inner raceways two passages for the re-circulation of the rolling elements and planar guide surfaces for guiding the planar end surfaces of the rolling elements; the improvement comprising retaining means for retaining the rolling elements to within a predetermined distance from the rectilinear inner raceways, which retaining means comprise means defining blind axial apertures in opposite ends of the rolling elements, grooves in the body structure adjacent the planar guide surfaces, retaining elements extending axially of the rolling elements into the apertures and axially beyond the planar guide surfaces and into the grooves and links interconnecting the retaining elements in an articulated link arrangement consituting an endless chain structure on each side of the row of rolling elements, the grooves defining surfaces co-operative with the chain structure axially of the rolling elements for retaining the retaining elements in the apertures.

12. In a rolling bearing for guiding two parts subjected to a relative movement of translation, cpmprising a row of rolling elements having planar end surfaces, a body structure defining two rectilinear and parallel inner raceways, two semi-circular inner raceways which interconnect the rectilinear inner raceways, two part-circular outer raceways defining with the semi-circular inner raceways two passages for the re-circulation of the rolling elements and planar guide surfaces for guiding the planar end surfaces of the rolling elements, and retaining means for retaining the rolling elements to within a predetermined distance from the rectilinear inner raceways; the feature that said retaining means comprise means defining blind axial apertures in opposite ends of the rolling elements, grooves in the body structure adjacent the planar guide surfaces, retaining elements extending into the apertures and into the grooves and links interconnecting the retaining elements in an articulated link arrangement constituting an endless chain structure on each side of the row of rolling elements, the grooves defining surfaces co-operative with the chain structure for retaining elements in the apertures, the bearing further comprising inserted cylindrical elements of small diameter respectively separating and in rolling contact with successive rolling elements, and two retaining boss portions on each of the links of each chain structure for retainingly engaging an end portion of the corresponding inserted element.

13. A bearing as claimed in claim 12, wherein each chain structure comprises alternately links carrying two of said retaining elements and links having no retaining element but means defining two apertures through each of which aperutures the retaining element carried by an adjacent link extends.

14. A bearing as claimed in claim 12, wherein each chain structure comprises identical links, each link having a first portion carrying one of said retaining elements and a second portion defining an aperture through which aperture the retaining element of the adjacent link extends, the second portion of the links being offset toward the rolling elements from the first portion of the links.

15. In a rolling bearing for guiding two parts subjected to a relative movement of translation, comprising a row of rolling elements having planar end surfaces, a body structure defining two rectilinear and parallel inner raceways, two semi-circular inner raceways which interconnect the rectilinear inner raceways, two part-circular outer raceways defining with the semi-circular inner raceways two passages for the re-circulation of the rolling elements and planar guide surfaces for guiding the planar end surfaces of the rolling elements, and retaining means for retaining the rolling elements to within a predetermined distance from the rectilinear inner raceways; the feature that said retaining means comrpise means defining blind axial apertures in opposite ends of the rolling elements, grooves in the body structure adjacent the planar guide surfaces, retaining elements extending into the apertures and into the grooves and links interconnecting the retaining elements in an articulated link arrangement constituting an endless chain structure on each side of the row of rolling elements, the grooves defining surfaces co-operative with the chain structure for retaining the retaining elements in the apertures, each chain structure comprising alternately links carrying two of said retaining elements and links having no retaining element but means defining two apertures through each of which apertures the retaining element carried by an adjacent link extends.

16. In a rolling bearing for guiding two parts subjected to a relative movement of translation, comprising a row of rollling elements having planar end surfaces, a body structure defining two rectilinear and parallel inner raceways, two semi-circular inner raceways which interconnect the rectilinear inner raceways, two part-circular outer raceways defining with the semi-circular inner raceways two passages for the re-circulation of the rolling elements and planar guide surfaces for guiding the planar end surfaces of the rolling elements, and retaining means for retaining the rolling elements to within a predetermined distance from the rectilinear inner raceways; the feature that said retaining means comprise means defining blind axial apertures in opposite ends of the rolling elements, grooves in the body structure adjacent the planar guide surfaces, retaining elements extending into the apertures and into the grooves and links interconnecting the retaining elements in an articulated link arrangement constituting an endless chain structure on each side of the row of rolling elements, the grooves defining surfaces co-operative with the chain structure for retaining the retaining elements in the apertures, each chain structure comprising identical links, each link having a first portion carrying one of said retaining elements and a second portion defining an aperture through which aperture the retaining element of the adjacent link extends, the second portion of the links being offset toward the rolling elements from the first portion of the links.

17. In a rolling bearing for guiding two parts subjected to a relative movement of translation, comprising a row of rolling elements having planar end surfaces, a body structure defining two rectilinear and parallel inner raceways, two semi-circular inner raceways which interconnect the rectilinear inner raceways, two part-circular outer raceways defining with the semi-circular inner raceways two passages for the re-circulation of the rolling elements and planar guide surfaces for guiding the planar end surfaces of the rolling elements the improvement comprising retaining means for retaining the rolling elements to within a predetermined distance from the rectilinear inner raceways, which retaining means comprise means defining axial apertures in opposite ends of the rolling elements and grooves in the body structure adjacent the planar guide surfaces and retaining elements extending into the apertures and into the grooves, the grooves defining surfaces which are engageable by the retaining elements axially of the rolling elements for retaining the retaining elements in the apertures.

18. In a rolling bearing for guiding two parts subjected to a relative movement of translation, comprising a row of rolling elements having planar end surfaces, a body structure defining two rectilinear and parallel inner raceways, two semi-circular inner surfaces which interconnect the rectilinear inner raceways, means defining with the two semi-circular inner surfaces passages for the re-circulation of the rolling elements, planar guide surfaces for guiding the planar end surfaces of the rolling elements, and retaining means for retaining the rolling elements to within a predetermined distance from the rectilinear inner raceways; the feature that said retaining means comprise cylindrical projecting portions of smaller diameter than the diameter of the rolling elements extending axially from said planar end surfaces of the rolling elements, and the retaining means further comprise two inner parallel planar side faces defined by the body structure and disposed in facing relation to each other and extending alongside the rectilinear inner raceways, two flat rings respectively engaging the two planar side faces and defining inner edges in retaining relation to said projecting portions of the rolling elements and means securing the rings to the body structure.

19. A rolling bearing as claimed in claim 18, wherein each ring is a sheet metal ring.

20. A rolling bearing as claimed in claim 18, wherein each ring has a planar surface which faces inwardly of the body structure and constitutes one of said guide surfaces for the planar end surfaces of the rolling elements.

21. A rolling bearing as claimed in claim 18, wherein the body structure defines shoulders located between the raceways and the respective side faces of the body and having a planar surface constituting one of said planar guide surfaces for guiding the planar end surfaces of the rolling elements.

22. A rolling bearing as claimed in claim 18, wherein the rings are detachable from the body structure.

23. A rolling bearing as claimed in claim 18, comprising two end members engaging ends of the body structure and means for securing the end members to the body structure so as to define re-circulation passages with said semi-circular inner surfaces.

24. A rolling bearing as claimed in claim 23, wherein said means for securing the rings to the body structure comprise said end members which are in clamping relation to semi-circular end portions of the rings.

25. A rolling bearing as claimed in claim 18, wherein each ring defines an inner aperture defining said edges and having a transverse dimension which exceeds the distance between an intermediate region of transition between each rectilinear raceway and each adjacent side face of the body structure and opposed outer edge of the body structure.

26. In a rolling bearing for guiding two parts subjected to a relative movement of translation, comprising a row of rolling elements having planar end surfaces, a body structure defining two rectilinear and parallel inner raceways, two semi-circular inner surfaces which interconnect the rectilinear inner raceways, means defining with the semi-circular inner surfaces two passages for the re-circulation of the rolling elements and planar guide surfaces for guiding the planar end surfaces of the rolling elements; the improvement comprising retaining means for retaining the rolling elements to within a predetermined distance from the rectilinear inner raceways, which retaining means comprise means defining blind axial apertures in opposite ends of the rolling elements, the rolling elements being solid in a part of the rolling elements intermediate the blind apertures, said retaining means further comprising grooves in the body structure adjacent the planar guide surfaces and retaining elements extending axially of the rolling elements into the apertures and axially beyond the planar guide surfaces and into the grooves, the grooves defining surfaces which are engageable by the retaining elements axially of the rolling elements for retaining the retaining elements in the apertures.

* * * * *